(12) United States Patent
Girondi

(10) Patent No.: US 11,536,173 B2
(45) Date of Patent: Dec. 27, 2022

(54) BLOW-BY GAS FILTRATION ASSEMBLY

(71) Applicant: UFI FILTERS S.P.A., Mantova (IT)

(72) Inventor: Giorgio Girondi, Mantova (IT)

(73) Assignee: UFI FILTERS S.P.A., Mantova (IT)

( * ) Notice: Subject to any disclaimer, the term of this patent is extended or adjusted under 35 U.S.C. 154(b) by 13 days.

(21) Appl. No.: 17/415,436

(22) PCT Filed: Dec. 12, 2019

(86) PCT No.: PCT/IB2019/060718
§ 371 (c)(1),
(2) Date: Jun. 17, 2021

(87) PCT Pub. No.: WO2020/128739
PCT Pub. Date: Jun. 25, 2020

(65) Prior Publication Data
US 2022/0056826 A1 Feb. 24, 2022

(30) Foreign Application Priority Data

Dec. 20, 2018 (IT) .......................... 102018000020413

(51) Int. Cl.
*F01M 13/04* (2006.01)
*B01D 50/20* (2022.01)
(Continued)

(52) U.S. Cl.
CPC ............. *F01M 13/04* (2013.01); *B01D 45/12* (2013.01); *B01D 46/2411* (2013.01);
(Continued)

(58) Field of Classification Search
CPC ........... F01M 13/04; F01M 2013/0422; F01M 2013/0438; B01D 45/12; B01D 46/2411; B01D 50/20
See application file for complete search history.

(56) References Cited

U.S. PATENT DOCUMENTS

| 6,152,120 A * | 11/2000 | Julazadeh | ............... F01M 13/04 |
| | | | 123/572 |
| 8,794,222 B2 * | 8/2014 | Schwandt | ............ F01M 13/022 |
| | | | 123/573 |

(Continued)

FOREIGN PATENT DOCUMENTS

| FR | 2 933 626 A1 | 1/2010 |
| JP | 2003-065030 A | 3/2003 |

(Continued)

OTHER PUBLICATIONS

International Search Report and Written Opinion of the International Searching Authority for International Patent Application No. PCT/IB2019/060718 dated Feb. 28, 2020, 9 pages.

(Continued)

*Primary Examiner* — Kurt Philip Liethen
(74) *Attorney, Agent, or Firm* — Merchant & Gould P.C.

(57) ABSTRACT

A blow-by gas filtration assembly (1) fluidly connects an internal combustion engine crankcase ventilation circuit to receive blow-by gases and filter from the gases the suspended particles contained therein. The filtration assembly (1) includes a hollow cylindrical filter group (2) which can be radially crossed by the blow-by gases. In addition, the filtration assembly (1) has a control group (3) that supports and commands in rotation the filter group (2) including: i) a hollow shaft (4) extending along the axis (X-X) in the filter group (2), defining an inner duct (400) fluidly connected with the central cavity (200) for the circulation of the blow-by gases. An electric motor (5) includes a stator (51) and a hollow rotor (52) operatively connected to the hollow shaft (4) to receive an electromagnetic control action from the stator (51) and command in rotation the hollow shaft (4) and thus the filter group (2).

24 Claims, 3 Drawing Sheets

(51) Int. Cl.
*B01D 45/12* (2006.01)
*B01D 46/24* (2006.01)

(52) U.S. Cl.
CPC ..... *B01D 50/20* (2022.01); *F01M 2013/0422* (2013.01); *F01M 2013/0438* (2013.01)

(56) References Cited

U.S. PATENT DOCUMENTS

| | | | | |
|---|---|---|---|---|
| 8,974,567 | B2* | 3/2015 | Verdegan | F01M 13/04 55/400 |
| 10,927,730 | B2* | 2/2021 | Barreteau | B01D 45/14 |
| 2010/0294218 | A1* | 11/2010 | Ruppel | F01M 13/022 123/573 |
| 2011/0180051 | A1* | 7/2011 | Schwandt | F01M 13/04 123/573 |
| 2011/0180052 | A1* | 7/2011 | Schwandt | F01M 13/04 123/573 |
| 2011/0252974 | A1* | 10/2011 | Verdegan | F01M 13/04 96/178 |
| 2019/0176076 | A1* | 6/2019 | Wood | F01M 13/04 |

FOREIGN PATENT DOCUMENTS

| | | | |
|---|---|---|---|
| WO | 2016/200895 | A1 | 12/2016 |
| WO | 2017/040289 | A1 | 3/2017 |

OTHER PUBLICATIONS

Italian Search Report for Italian Patent Application No. 2018000020413 dated Sep. 2, 2019, 2 pages.

\* cited by examiner

BLOW-BY GAS FILTRATION ASSEMBLY

This application is a National Stage Application of PCT/IB2019/060718, filed 12 Dec. 2019, which claims benefit of Ser. No. 10/2,018,000,020,413, filed 20 Dec. 2018 in Italy, and which applications are incorporated herein by reference. To the extent appropriate, a claim of priority is made to each of the above-disclosed applications.

FIELD OF APPLICATION

The present invention relates to a blow-by gas filtration assembly.

In particular, the blow-by gas filtration assembly of the present invention can be fluidly connected to the crankcase ventilation circuit of an internal combustion engine system inside a vehicle to receive blow-by gases (from said crankcase) and filter from them the suspended particles contained therein.

Specifically, "blow-by gas" means oil vapours vented from the crankcase of an internal combustion engine during its operation. In particular, said blow-by gases have a composition similar to that of exhaust gases and are generated by combustion of the air/fuel mixture in the combustion chamber. Instead of reaching the exhaust gas emission circuit, these gases leak into the lower portion of the crankcase, passing alongside the cylinders and bringing carbon particles and oil drops with them. In the present discussion, for the sake of simplicity, blow-by gases are considered to consist of air and suspended particles; said suspended particles comprise oil droplets and/or carbonaceous particulates.

STATE OF THE ART

In the state of the art, solutions of filtration assemblies that can be fluidly connected to the crankcase and suitable for venting it from blow-by gases are known of.

Specifically, blow-by gas filtration assembly solutions which separate unwanted suspended particles from the aforesaid blow-by gases are known of, comprising a filter group having such purpose.

In the state of the art, a plurality of embodiments of filtration assemblies are known: for example, a first type provides for the presence of a filter group comprising a porous filter medium suitable for filtering blow-by gases when crossed by them; a second type provides for the presence of a filter group comprising a plurality of discs mutually spaced apart and guided in rotation, in which by the action of the centrifugal force the suspended particles are separated from the air; a third type which provides for the combination of the first two types, in which, in fact, a porous filter medium is provided that is guided in rotation.

In this context, with particular reference to the aforementioned third preferred embodiment, the known solutions are particularly complex and above all have an extensive footprint i.e. are of particularly large dimensions.

These solutions are complex and costly to manufacture and above all they occupy a large amount of space in the vehicle.

SOLUTION ACCORDING TO THE INVENTION

In the aforesaid state of the art the need is therefore strongly felt to have a blow-by gas filtration assembly that solves the aforesaid problem, being simple in shape and above all limited in size.

The purpose of the present invention is to provide a new embodiment of a blow-by gas filtration assembly which satisfies said requirement.

DESCRIPTION OF THE DRAWINGS

Further characteristics and advantages of the invention will, in any case, be evident from the description given below of its preferred embodiments, made by way of a non-limiting example with reference to the appended drawings, wherein.

DETAILED DESCRIPTION

Figure 1:
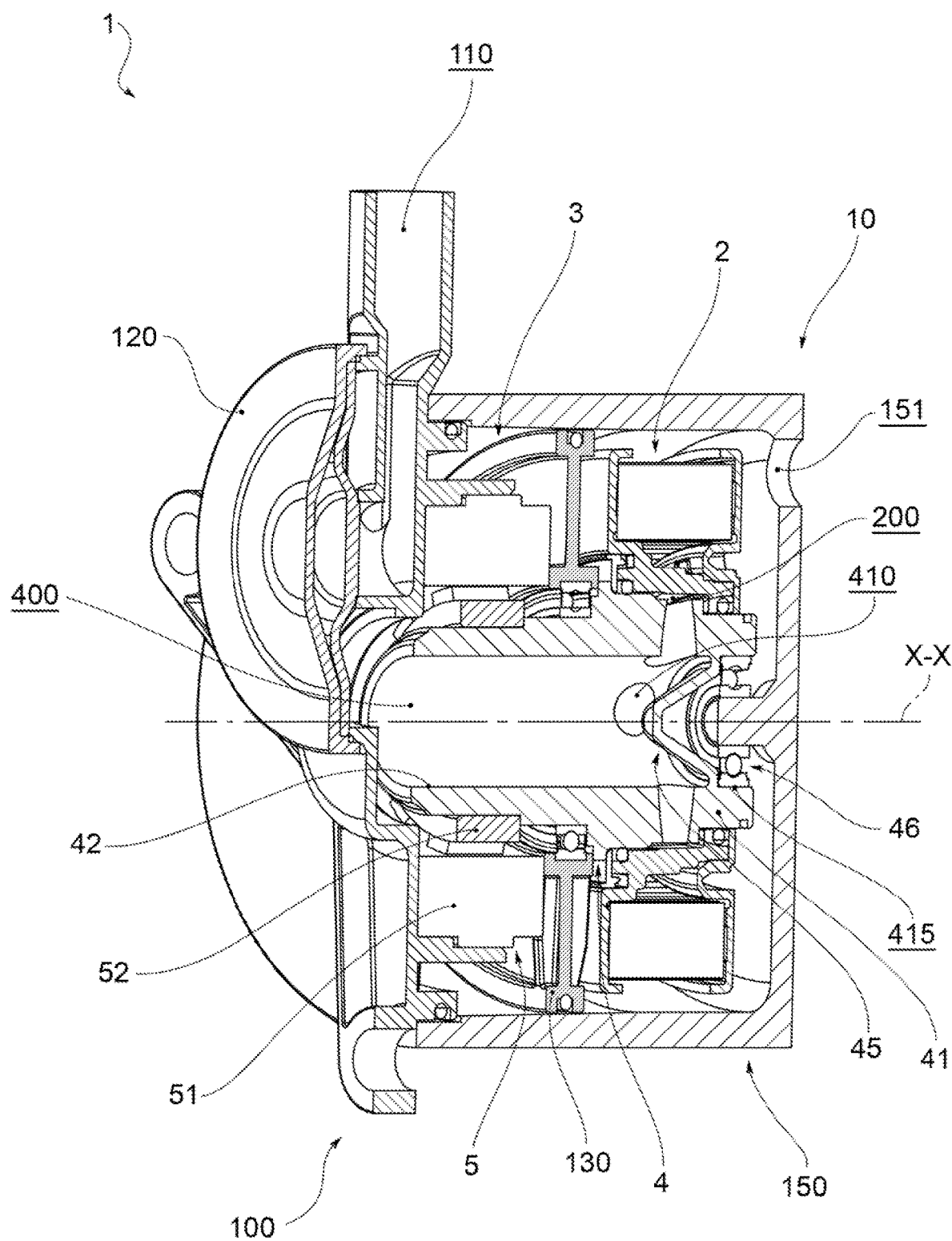
FIG. 1 shows a perspective view in longitudinal cross-section of the blow-by gas filtration assembly of the present invention, according to a preferred embodiment.
Figure 2:
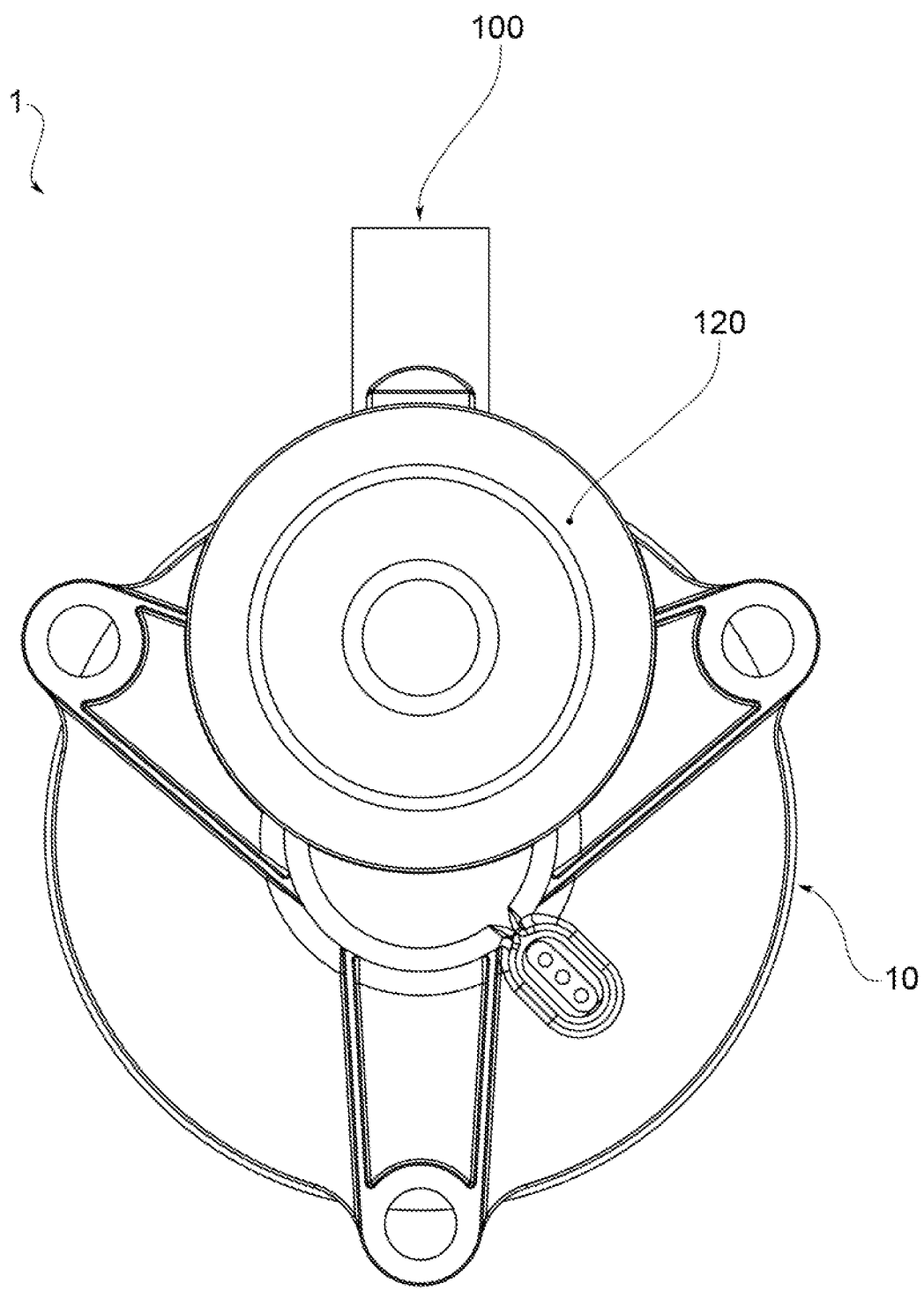
FIG. 2 shows a front view of the blow-by gas filtration assembly in FIG. 1.
Figure 3:
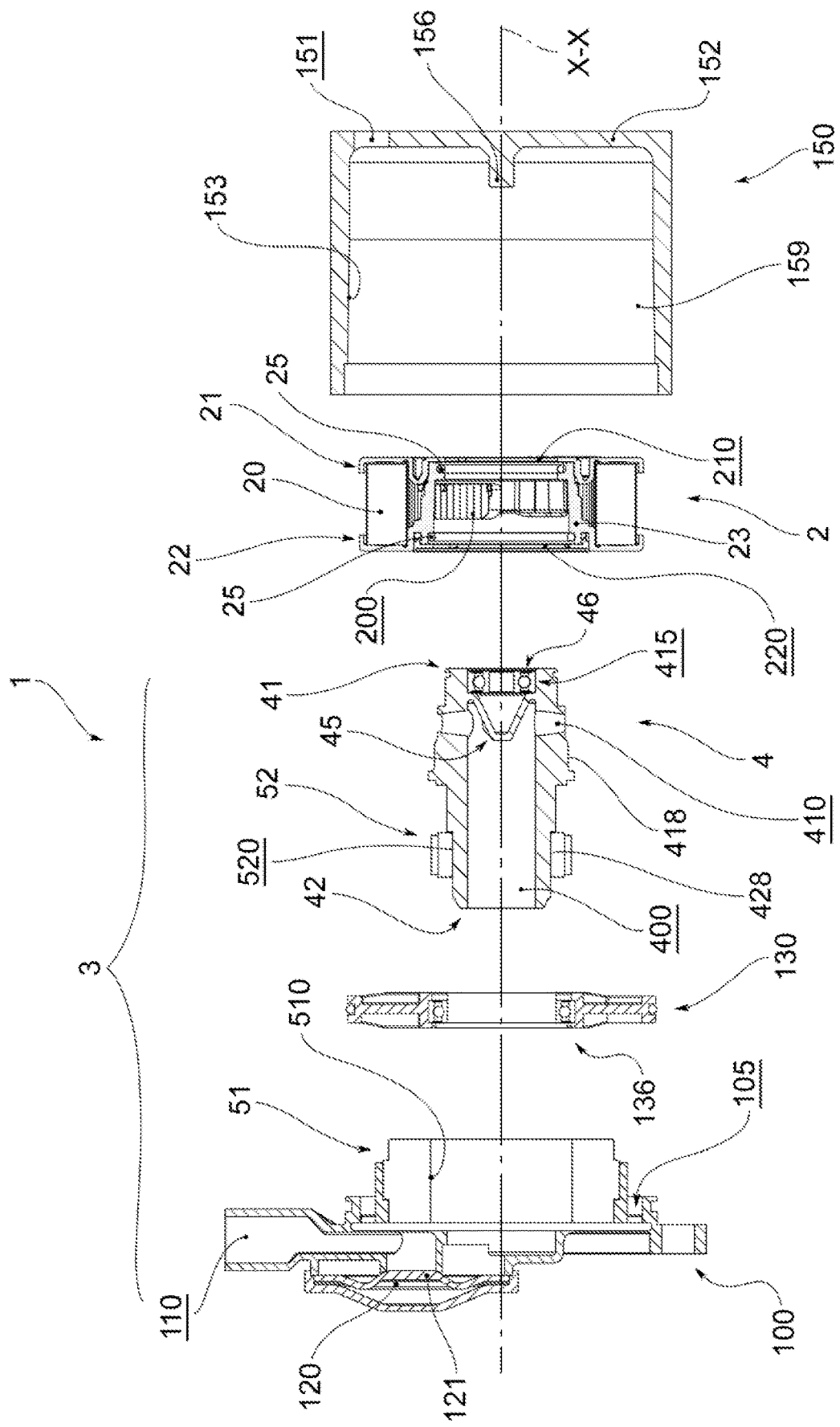
FIG. 3 shows a perspective view in separate parts of the blow-by gas filtration assembly in the above figures.

In the appended drawings, reference numeral 1 denotes a blow-by gas filtration assembly suitable for performing a filtration/separation action on particles (liquid and/or solid) suspended in the gas stream.

Said blow-by gas filtration assembly 1 can be fluidly connected to a crankcase ventilation circuit of an internal combustion engine of a vehicle to receive blow-by gases and filter from them the suspended particles contained therein, returning a stream of clean gas (i.e. filtered) to other vehicle systems such as, for example, to the engine air intake circuit communicating with the combustion chamber of the internal combustion engine.

According to a preferred embodiment, the blow-by gas filtration assembly 1 comprises a body assembly 10 which contains and supports the components described below and which can be fluidly connected with a crankcase ventilation circuit of an internal combustion engine of a vehicle to receive blow-by gases to be filtered, and with the air intake circuit, to recirculate to the combustion chamber the stream of gas filtered of solid and liquid particles.

Preferably, said blow-by gas filtration assembly 1 can be directly assembled to the crankcase of an internal combustion engine of a vehicle.

According to one embodiment, the blow-by gas filtration assembly 1 is a stand-alone device positioned, for example, in the engine compartment in a preferred position even distant from the crankcase.

According to a preferred embodiment, however, the crankcase itself comprises a blow-by gas filtration chamber in which the blow-by gas filtration assembly 1 described below is housed, at least in part; in other words, in such embodiment a portion of the assembly body 10 is integrally made in the crankcase itself.

Below, and in the appended drawings, the assembly body 10 is amply described according to a preferred embodiment.

According to the present invention, the filtration assembly 1 comprises an X-X axis with respect to which the components described below extend or are positioned.

According to the present invention, the filtration assembly 1 comprises a filter group 2, specifically suitable for performing said filtration/separation operations of the particles suspended in blow-by gases.

The filter group 2 extends along the X-X axis having a hollow cylindrical shape, comprising, in fact, a central cavity 200.

The filter group 2 can be crossed by blow-by gases radially.

In a preferred embodiment, the filter group 2 can be crossed by blow-by gases in a radial direction from the outside towards the inside.

In a preferred embodiment variant, the filter group 2 can be crossed by blow-by gases in a radial direction from the inside towards the outside.

According to a preferred embodiment, the filter group 2 comprises a filter medium 20. The filter medium 20, which can be crossed radially comprises a non-woven fabric pleated in the form of a star or a porous cylindrical septum.

Moreover, according to a preferred embodiment, the filter group 2 comprises two filter plates 21, 22 hermetically attached to the ends of the filter medium 20.

In addition, according to a preferred embodiment, the filter group 2 comprises a central structure 23 that is housed inside the filter medium 20 and/or encloses the filter medium 20. Preferably, said central structure 23 joins the two filter plates 21, 22, such that the filter plates 21, 22 are integrally connected in rotation. Preferably, said central structure 23 has a plurality of through openings suitable to allow the passage of the fluid being filtered.

As shown in the attached figures, the central cavity 200 extends through the filter plates 21, 22 surrounded by the filter medium 20.

According to a preferred embodiment, the central cavity 200 extends through respective through openings 210, 220 made on the filter plates 21, 22. Preferably, said openings 210, 220 are concentric to the X-X axis, like the central cavity 200.

According to the present invention, moreover, the filtration assembly 1 comprises a control group 3 which supports and commands the filter group 2 in rotation (about the X-X axis.).

The control group 3 has the dual purpose of supporting the filter group 2 while keeping it in a position aligned with respect to the X-X axis and rotating it at a preferred angular speed (about the X-X axis).

The control group 3 has the multiple purpose of supporting the filter group 2, keeping it in a position aligned with respect to the X-X axis and rotating it at a preferred angular speed and, furthermore, of fluidly connecting the blow-by gas ventilation circuit to the filter group 2, in particular to the central cavity 200 of said filter group 2.

According to the present invention, the control group 3 comprises a hollow shaft 4 which extends along the X-X axis at least partly inside the filter group 2 to which it is operatively connected and an electric motor 5 which commands in rotation said hollow shaft 4 and thus the filter group 2.

According to the present invention, the control group 3 comprises a hollow shaft 4 which extends along the X-X axis operatively connected to the filter group 2 and an electric motor 5 which commands in rotation said hollow shaft 4 and thus the filter group 2.

The electric motor 5 comprises a stator 51 and a hollow rotor 52 which receives an electromagnetic control action from the stator 51 and commands in rotation the hollow shaft 4 and thus the filter group 2. The hollow rotor 52, in fact, is operatively connected to the hollow shaft 4, being positioned thereon.

The electric motor 5 comprises a stator 51 and a hollow rotor 52 operatively connected to the control shaft 4 suitable to receive an electromagnetic control action from the stator 51 and command in rotation the hollow shaft 4 and thus the filter group 2. In particular, the hollow shaft 4 comprises an inner duct 400, fluidly connected with the central cavity 200; in other words, the hollow shaft 4 defines therein an inner duct 400 through which the blow-by gases flow.

In particular, the hollow shaft 4 comprises an inner duct 400 communicating with the blow-by gas ventilation circuit by means of respective openings provided at the opposite ends of the hollow shaft 4.

In the configuration with the filter group 2 crossed from the outside to the inside the blow-by gases flowing into the inner duct 400 are those filtered, i.e. clean.

In the configuration with the filter group 2 crossed from the inside to the outside, the blow-by gases flowing in the inner duct 400 are those to be filtered, i.e. dirty.

Preferably, the hollow shaft 4 extends axially between a bottom end 41 and a top end 42. In particular, the filter group 2 is placed in a position proximal to the bottom end 41 and the electric motor 5 is placed in a position proximal to the top end 42.

According to the present invention, the hollow shaft 4 has specific shoulders (one bottom shoulder 418 and one top shoulder 428) at the two opposite ends, on which the filter group 2 and the hollow rotor 52 are respectively fitted. Preferably, the filter group 2 can be inserted axially on the hollow shaft 4. Preferably, the filter group 2 has an annular shape and can be inserted axially around the hollow shaft 4 so that said hollow shaft 4 is housed in the central cavity 200 of the filter group 2.

Preferably, the hollow rotor 52 can be axially inserted on the hollow shaft 4. Preferably, the hollow rotor 52 is housed on the top shoulder 428.

Preferably, the hollow rotor 52 has an annular shape and can be inserted axially around the hollow shaft 4 so that said hollow shaft 4 is housed in the central rotor cavity 520 of the hollow rotor 52.

Preferably, the hollow rotor 52 is made in one piece, integrally with the hollow shaft 4. Preferably, the hollow shaft 4 and the hollow rotor 52 are a single component.

According to a preferred embodiment, the hollow shaft 4 is integral with the filter group 2. In other words, hollow shaft 4 and filter group 2 are a single component.

According to a preferred embodiment, the hollow shaft 4 is integrated into the filter group 2 and defines an inner duct 400 that places in fluidic communication the central cavity 200 of the filter group 2 with the blow-by gas ventilation circuit, even without intermediate components.

According to a preferred embodiment, the hollow shaft 4 is made integrally with the central structure 23 of the filter group 2 and is configured as an axial extension of the central structure 23 along the X-X axis, preferably in the direction towards which the electric motor 5 is located.

According to a preferred embodiment, the hollow shaft 4 is made integrally with one of the filter plates 21, 22 of the filter group 2 and is configured as an axial extension of one of the filter plates along the X-X axis, preferably in the direction towards which the electric motor 5 is located.

According to a preferred embodiment, the inner duct 400 is closed at the bottom end 41 and is open at the top end 42. In other words, the inner duct 400 is blind.

According to the present invention, the hollow shaft 4, on the portion on which the filter group 2 is positioned, comprises at least one radial hole 410 suitable for placing in fluidic communication the central cavity 200 and the inner duct 400. According to a preferred embodiment, the hollow shaft 4 comprises a plurality of radial holes 410 circumferentially arranged, preferably, angularly equidistant from each other.

According to a preferred embodiment, the hollow shaft 4 comprises an inner diffuser 45 housed in the inner duct 400 closing one end of the inner duct 400.

Preferably, the inner diffuser 45 housed in the inner duct 400 directs the blow-by gases improving their flow.

In the embodiment with the filter group 2 crossed from the outside to the inside the internal diffuser 45 directs the flow of filtered blow-by gases towards the outlet.

In the embodiment with filter group 2 crossed from the inside to the outside, the internal diffuser 45 directs the flow of filtered blow-by gases towards the filter medium 20.

Preferably, the inner diffuser 45 has a substantially tapered shape in the direction of the outlet.

Preferably, the inner diffuser 45 has a substantially conical, or pyramidal shape, having the proximal apex at the top end 42 and the proximal base at the bottom end 41.

According to a preferred embodiment, the filter group 2 and the hollow shaft 4 are mutually engaged to transmit the rotary action to each other by means of a shaped coupling.

According to a preferred embodiment, the hollow shaft 4 and the central structure 23, inside, are mutually operatively connected by a shaped coupling so that the hollow shaft 4 is suitable to transmit the rotatory action to the central structure 23. Preferably, the hollow shaft 4 comprises radial projections and the filter group 2 comprises corresponding radial recesses or vice versa. According to a preferred embodiment, the number and arrangement of said radial projections and radial recesses is such as to ensure and balance the rotational action.

According to a preferred embodiment, the filter group 2 is operatively connected tight with the hollow shaft 4 by means of one, preferably two, filter gaskets 25. Preferably, said filter gaskets 25 are housed on the respective filter plates 21, 22 or on said central structure 23.

Preferably, the hollow shaft 4 is made of aluminium alloy.

Preferably the hollow shaft 4 is made of thermoplastic material.

Preferably, the hollow shaft 4 is made of a nylon-based material (PA, PA 6, PA 6.6 or a mixture thereof).

Preferably, the hollow shaft 4 is made of a glass fibre reinforced nylon-based material. (PA+GF, PA 6.6+GF35, PA 6+PA 6.6+GF 35)

Preferably, the hollow shaft 4 is made of a material comprising a polyamide-based compound (e.g. PPA).

Preferably, the hollow shaft 4 is made of the same material with which the central structure 23 and/or the filter plates 21,22 of the filter group 2 are made.

As mentioned, according to a preferred embodiment, the hollow rotor 52 is integrally, firmly connected to the hollow shaft 4. Preferably, the hollow rotor 52 has a substantially annular shape comprising angularly equally spaced rotor poles facing a stator inner wall 510.

Preferably, the hollow rotor 52 is a separate element which is mountable on the hollow shaft 4 to rotate in sync with said hollow shaft 4 and thus determine a controlled rotation of the filter assembly 2.

Preferably, the hollow rotor 52 has a substantially annular shape and is integrally connected to the outer surface of the hollow shaft 4.

Preferably, the hollow rotor 52 has a substantially annular shape and surrounds the inner duct 400 defined by the hollow shaft 4.

Preferably, the hollow rotor 52 and hollow shaft 4 are arranged coaxially.

Preferably, the hollow rotor 52 and hollow shaft 4 are arranged coaxially to the X-X axis, resulting coaxial to the filter group 2.

Preferably, the hollow rotor 52 and the hollow shaft are joined by moulding, i.e. they are subject to a moulding operation that joins them in an integral manner. Preferably, the hollow rotor 52 and the hollow shaft 4 are joined by injection moulding.

Preferably, the hollow rotor 52 is embedded in the hollow shaft 4.

Preferably, the hollow rotor 52 and the hollow shaft 4 are coupled by interference.

According to a preferred embodiment, the hollow shaft 4 also comprises a support bearing 46.

Preferably, the support bearing 46 is located at the opposite end to the electric motor 5. Preferably, the support bearing 46 is housed in a support cavity 415 made at the bottom end 41 of the hollow shaft 4.

Preferably, the support bearing 46 and the hollow shaft 4 are joined by moulding, i.e. they are subject to a moulding operation that joins them in an integral manner. Preferably, the support bearing 46 and the hollow shaft 4 are joined by injection moulding.

As already mentioned, according to the present invention, the blow-by gas filtration assembly 1 comprises an assembly body 10.

According to a preferred embodiment, said assembly body 10 comprises a closing cover 100 suitable for delimiting the filtration chamber in which blow-by gas filtration operations take place.

According to a preferred embodiment, moreover, said assembly body 10 comprises a cup body 150 that can be closed by the closing cover 100 to delimit an assembly housing 159 in which the filter group 2 and the control group 3 are housed.

According to one embodiment, the closing cover 100 is fitted directly to the crankcase to delimit the filtration chamber enclosed therein.

According to a preferred embodiment, the fluidic connection 110 through which the blow-by gases circulating through the inner duct 400 flow, is made in the closing cover 100.

According to a preferred embodiment, the stator 51 is housed on said closing cover 100.

Preferably, the closing cover 100 comprises an annular housing 105 in which the stator 51 is housed.

According to a preferred embodiment, the filtered blow-by gases flow into the inner duct 400 and flow out of the blow-by gas filtration assembly 1 through the fluidic connection 110.

According to a preferred embodiment, the closing cover 100 comprises a ventilation valve 120 fluidly operating with the fluidic connection 110 suitable to regulate the flow rate of blow-by gases flowing into the filtration assembly 1. Preferably, the ventilation valve 120 is suitable to prevent the occurrence of overpressures in the ventilation circuit of the crankcase of an engine.

Preferably, said ventilation valve 120 comprises an elastically yielding membrane element 121 yielding when subjected to a pressure greater than a certain threshold value. According to one embodiment variant, the blow-by gases to be filtered flow through the fluidic connection 110 to reach the inner duct 400 and thus the filter group 2.

According to a preferred embodiment, the assembly body 10 also comprises a support plate 130 axially positioned between the filter group 2 and the electric motor 5 operatively connected with the hollow shaft 4 to support it rotationally free.

Preferably, said support plate 130 comprises an intermediate support bearing 136 suitable for engaging the hollow shaft 4 with its inner fifth wheel, engaging an outer wall thereof.

As mentioned, the assembly body 10 comprises a cup body 150 suitable for delimiting the assembly housing 159.

Preferably, the cup body 150 comprises a circulation mouth 151 through which blow-by gases flow, to be filtered in arrival from the crankcase or already filtered, depending on the embodiment. Preferably said circulation mouth 151 is made in a region proximal to the filter group 2.

Preferably, the circulation mouth 151 is made on a bottom wall 152 axially opposite the closing cover 100.

The walls of the cup body 150, in addition to delimiting said assembly housing 159, are also suitable for supporting and keeping the various components contained therein aligned along the X-X axis.

According to this preferred embodiment, the hollow shaft 4 engages the bottom wall 152. Preferably, the support bearing 46 engages a suitable support collar protruding from the bottom wall 152.

According to this preferred embodiment, the support plate 130 engages a side wall 153 of the cup body 150.

Preferably, the support plate 130 sealingly engages the side wall 153.

In the embodiment in which the cup body 150 is not provided, but all the components are inside the filtration chamber, all the features described above for the cup body 150 are found in the filtration chamber.

Innovatively, the blow-by gas filtration assembly of the present invention widely fulfils the purpose of the present invention by presenting itself in a simple form and above all being of reduced dimensions.

Advantageously, the electric motor is extremely compact and is made directly on the hollow shaft.

Advantageously, the electric motor is extremely compact and can be fixed directly to the inner surface of the closing cover of the filter assembly.

Advantageously, the blow-by gas filtration assembly has a blow-by gas passage in the space occupied by the filter group and by the control group (and especially by the electric motor).

Advantageously, the dimensional footprint of the filtration assembly (particularly along the direction of the X-X axis) is reduced since the blow-by gas circulation duct is made, at least partially, in the space also occupied by the electric motor.

Advantageously, the filtration assembly makes it possible to optimise the exploitation of the available space, making it possible to increase the filter surface of the filter group and thus prolong the service life of the filter and reduce the pressure drops imposed on the blow-by gas ventilation circuit.

Advantageously, the hollow shaft effectively transfers to the filter group the torque generated by the control group fluidically delimiting a duct for the flow of blow-by gases.

Advantageously, the electric motor is in a position to be cooled by the blow-by gases circulating in a circulation duct made along the axis of the electric motor.

Advantageously, preferably, the electric motor is in a position such as to be cooled by the filtered blow-by gases thus having a lower temperature than the blow-by gases to be filtered.

Advantageously, the blow-by gas filtration assembly is simple to assemble/disassemble. Advantageously, the filter group is simple to assemble/disassemble.

Advantageously, the blow-by gas filtration assembly is extremely effective in the action on said blow-by gases thanks to the combined action of the filter group that filters and above all agglomerates the suspended particles that are subsequently subjected to the centrifugal rotation action.

Advantageously, the hollow shaft directs the flow of blow-by gases. Preferably, the hollow shaft favours the outflow of the filtered blow-by gases towards the outlet. Preferably, the hollow shaft favours the flow of blow-by gases to be filtered towards the filter group.

Advantageously, the hollow shaft is made in a hollow shape and of thermoplastic material or of a low-density metal alloy (e.g. aluminium alloy) reducing the weight of the filtration assembly and therefore the consumption associated with the operation of the filtration assembly.

Advantageously, the hollow shaft can be integrated into the filter group, reducing the number of components of the filtration assembly.

Advantageously, with a minimum number of seals, the potential problem of blow-by gas leakage is remedied.

Advantageously, the filter group requires a minimum number of sealing elements, for example, a single gasket, possibly two gaskets, is sufficient.

Advantageously, the filtration assembly can be placed in the vehicle in a predefined position not necessarily proximal to the internal combustion engine.

Advantageously, the filtration assembly can be placed in the vehicle as an integral part of the crankcase of the internal combustion engine.

It is clear that a person skilled in the art may make modifications to the blow-by gas filtration assembly so as to satisfy contingent requirements, all contained within the scope of protection as defined by the following claims.

LIST OF REFERENCE NUMBERS

1 blow-by gas filtration assembly
2 filter group
20 filter medium
21, 22 filter plates
210, 220 through openings
23 central structure
25 inner filter gaskets
28 radial recesses
200 central cavity
3 control group
4 hollow shaft
41 bottom end
410 radial hole
415 support cavity
418 bottom shoulder
42 top end
428 top shoulder
45 inner diffuser
46 support bearing
5 electric motor
51 stator
510 inner stator wall
52 hollow rotor
520 central rotor cavity
10 assembly body
100 closing cover
110 fluidic connection
120 ventilation valve
121 elastically yielding membrane element
130 support plate
135 intermediate support bearing 150 cup body
151 circulation mouth
152 bottom wall
153 side wall
156 support collar
159 assembly housing
X-X rotation axis

The invention claimed is:

1. A blow-by gas filtration assembly fluidly connectable to a crankcase ventilation circuit of an internal combustion engine to receive blow-by gases and filter suspended particles contained in the blow-by gases, wherein the filtration assembly has an axis and comprises:
 a filter group which extends along the axis and has a hollow cylindrical shape comprising a central cavity configured for being crossed by blow-by gases radially;
 a control group that supports and rotates the filter group comprising:
i) a hollow shaft extending along the axis at least partially inside the filter group to which the hollow shaft is operatively connected, defining an inner duct fluidly connected with the central cavity for circulation of the blow-by gases;
ii) an electric motor comprising a stator and a hollow rotor, wherein the hollow rotor is operatively connected to the hollow shaft positioned thereon, to receive an electromagnetic control action from the stator and command in rotation the hollow shaft and thus the filter group.

2. The blow-by gas filtration assembly according to claim 1, wherein the hollow shaft extends axially between a bottom end and a top end wherein the inner duct is closed at the bottom end and is open at the top end.

3. The blow-by gas filtration assembly according to claim 2, wherein the filter group is positioned in a position proximal to the bottom end and the hollow rotor is positioned in a position proximal to the top end.

4. The blow-by gas filtration assembly according to claim 1, wherein the hollow shaft, on the portion on which the filter group is positioned, comprises at least one radial hole for placing in fluidic communication the central cavity and the inner duct.

5. The blow-by gas filtration assembly according to claim 1, wherein the hollow shaft comprises an internal diffuser housed in the inner duct that closes one end of the inner duct and directs flow of blow-by gases.

6. The blow-by gas filtration assembly according to claim 1, wherein the filter group comprises a filter medium and two filter plates hermetically fixed to ends of the filter medium.

7. The blow-by gas filtration assembly according to claim 6, wherein the filter group comprises a central structure which houses the filter medium inside the central structure, and/or encloses the filter medium and joins the two filter plates, wherein the filter plates are integrally connected in rotation.

8. The blow-by gas filtration assembly according to claim 1, wherein the filter group is operatively connected tight with the hollow shaft by a filter gasket.

9. The blow-by gas filtration assembly according to claim 1, wherein the hollow rotor is integrally, fully connected to the hollow shaft, as a single component.

10. The blow-by gas filtration assembly according to claim 1, wherein the hollow rotor has a substantially annular shape comprising angularly equally spaced rotor poles facing an inner stator wall.

11. The blow-by gas filtration assembly according to claim 1, wherein the hollow shaft comprises a support bearing.

12. The blow-by gas filtration assembly according to claim 1, wherein the hollow shaft is integrally, fully connected to the filter group as a single component.

13. The blow-by gas filtration assembly according to claim 1, wherein the filter medium is configured for being crossed by the blow-by gases radially from outside to inside, wherein the filtered blow-by gases flow in the inner duct.

14. The blow-by gas filtration assembly according to claim 1, wherein the filter medium is configured for being crossed by the blow-by gases radially from inside to outside, wherein the blow-by gases to be filtered flow in the inner duct.

15. The blow-by gas filtration assembly according to claim 1, further comprising an assembly body comprising a closing cover in which a fluidic connection is made through which blow-by gases circulating through the inner duct flow.

16. The blow-by gas filtration assembly according to claim 15, wherein the stator is housed on said closing cover.

17. The blow-by gas filtration assembly according to claim 15 wherein the filter medium is configured for being crossed by the blow-by gases radially from inside to outside, wherein the blow-by gases to be filtered flow in the inner duct, wherein the closing cover comprises a ventilation valve fluidly operating with the fluidic connection comprising an elastically yielding membrane element for adjusting the flow rate of blow-by gases flowing into the filtration assembly.

18. The blow-by gas filtration assembly according to claim 1, wherein the assembly body further comprises a support plate axially positioned between the filter group and the electric motor operatively connected with the hollow shaft to support the hollow shaft rotationally free.

19. The blow-by gas filtration assembly according to claim 1, wherein the assembly body comprises a cup body configured to be closed by the closing cover identifying an assembly housing in which the filter group and the control group are housed, wherein the cup body comprises a circulating mouth through which the blow-by gases, to be filtered or filtered, flow.

20. The blow-by gas filtration assembly according to claim 19, wherein the hollow shaft is engaged and rotationally supported free at a bottom wall of the cup body.

21. A crankcase of an internal combustion engine operatively and fluidly connectable with a blow-by gas filtration assembly according to claim 14, wherein the crankcase comprises a blow-by gas filtration chamber in which said blow-by gas filtration assembly is, at least partially, housed.

22. The blow-by gas filtration assembly according to claim 1, wherein the filter group is operatively connected tight with the hollow shaft by two filter gaskets.

23. The blow-by gas filtration assembly according to claim 1, wherein central cavity is configured for being crossed by blow-by gases radially from outside to inside.

24. The blow-by gas filtration assembly according to claim 1, wherein the hollow shaft comprises an internal diffuser housed in the inner duct, the internal diffuser closing one end of the inner duct and directing flow of blow-by gases, extending in a substantially tapered shape.

* * * * *